United States Patent [19]
Jansen

[11] Patent Number: 6,160,725
[45] Date of Patent: Dec. 12, 2000

[54] SYSTEM AND METHOD USING PHASE DETECTION TO EQUALIZE POWER FROM MULTIPLE POWER SOURCES

[75] Inventor: Arian M. Jansen, Thousand Oaks, Calif.

[73] Assignee: NMB USA Inc., Chatsworth, Calif.

[21] Appl. No.: 09/267,411

[22] Filed: Mar. 12, 1999

[51] Int. Cl.$^7$ .................................................. H02M 3/335
[52] U.S. Cl. ............................................................ 363/65
[58] Field of Search ................................. 363/65, 67, 69, 363/71; 307/82

[56] References Cited

U.S. PATENT DOCUMENTS

| | | |
|---|---|---|
| 4,405,976 | 9/1983 | Mitchell et al. . |
| 4,779,184 | 10/1988 | White . |
| 4,886,981 | 12/1989 | Lentini et al. . |
| 5,079,686 | 1/1992 | Vinciarelli . |
| 5,309,344 | 5/1994 | Smith . |
| 5,566,061 | 10/1996 | Uchino ...................................... 363/71 |
| 5,875,104 | 2/1999 | Prager ....................................... 363/65 |

Primary Examiner—Adolf Deneke Berhane
Attorney, Agent, or Firm—Amster, Rothstein & Ebenstein

[57] ABSTRACT

A system and a method may use variable-frequency power sources for supplying power to a load. The system and method use phase detection in order to automatically and substantially equalize the currents supplied to a load by each of the variable-frequency power sources, and to cancel a ripple component of the input current drawn by the system. First and second power sources supply power to the load. The power sources have a similar relationship between their respective variable switching frequencies and the power that they supply to the load. First and second switching frequencies of, respectively, the first and second power sources are locked to one another using phase detection to substantially equalize the power supplied to the load by each power source. The system and method are advantageously utilized to provide a power factor correction front-end for a switch-mode power supply. Power sources with non-linear and/or inverse relationships between power supplied and switching frequency can be used. In alternate embodiments power from series power sources is equalized by equalizing voltages supplied by each power source to a load.

30 Claims, 9 Drawing Sheets

SYSTEM AND METHOD USING PHASE DETECTION TO EQUALIZE POWER FROM MULTIPLE POWER SOURCES

BACKGROUND OF THE INVENTION

1. Field of the Invention

The present invention relates generally to systems for supplying power to a load, and, in particular, to such systems that use plural power sources where the power supplied from the power sources is equalized.

2. Description of Background Art

Figure 1:
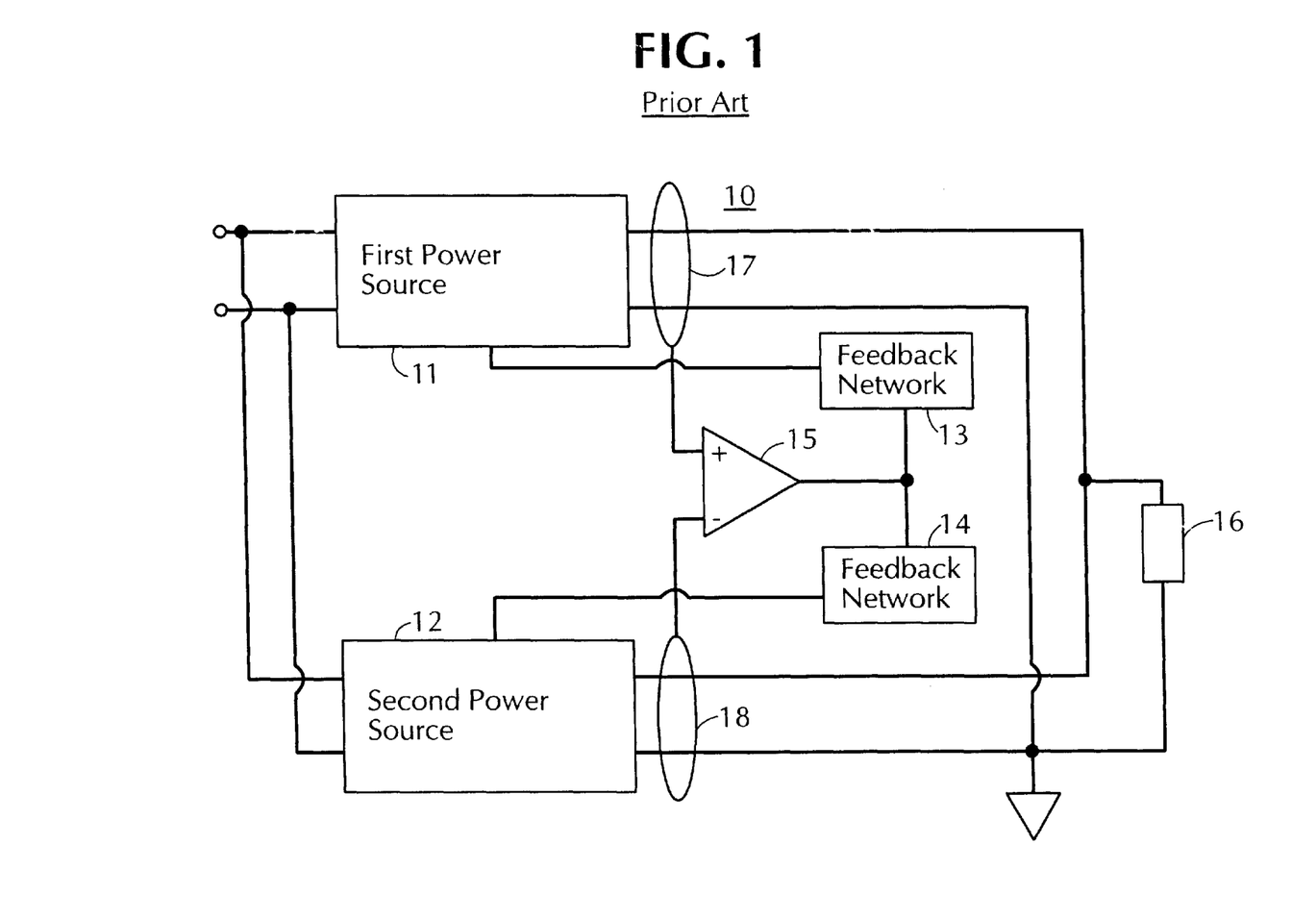
FIG. 1 is a block diagram of a prior art system for supplying power to a load.

It is known to couple two power sources together to supply power to a common load. FIG. 1 shows a block diagram of a prior art system 10 for supplying power to a load. The system shown in FIG. 1 includes first and second power sources 11 and 12 that are coupled to one another in parallel. The power sources 11 and 12 use first and second feedback networks 13 and 14 to regulate the voltages applied to the load 16 by the power sources 11 and 12. Each power source 11 and 12 also includes a respective current sensing means 17 and 18 to monitor the current supplied to the load 16 by that power source. Each current sensing means 17 and 18 generates a voltage that is representative of the current supplied by the associated power source 11 and 12 to the load 16. The voltages generated by the current sensing means 17 and 18 are compared by the amplifier 15, which provides an error voltage that is representative of the difference between the currents supplied to the load 16 by the power sources 11 and 12. This error voltage is applied to the feedback networks 13 and 14 to substantially equalize the currents supplied by each of the power sources 11 and 12 to the load 16. Accordingly, the power from the two power sources 11 and 12 is equalized.

Figure 2:
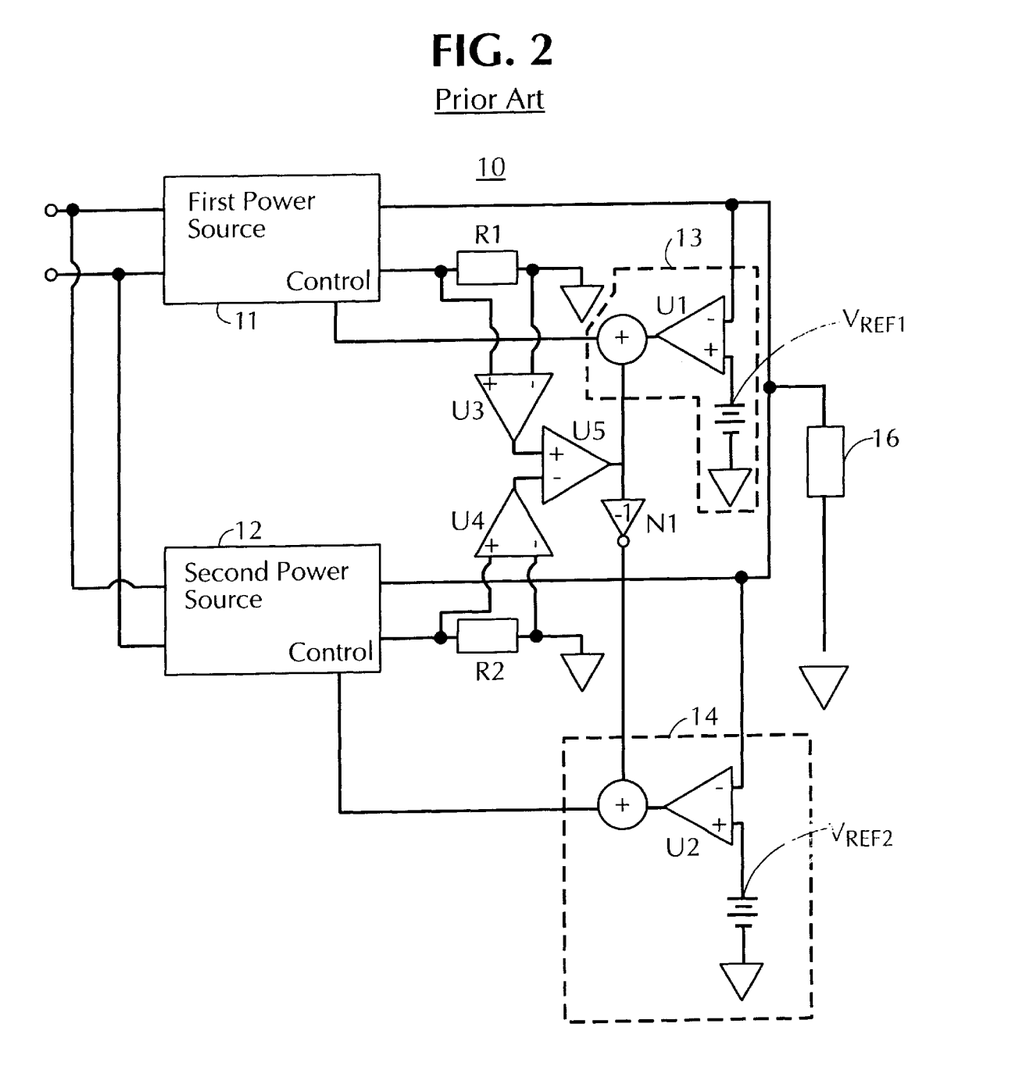
FIG. 2 is a schematic diagram of the prior art system shown in FIG. 1.

FIG. 2 shows a particular embodiment of the prior art system shown in FIG. 1. The power sources 11 and 12 are coupled in parallel to one another for supplying power to the load 16. The output voltage of the power source 11 is compared to a first reference voltage $V_{REF1}$ by the amplifier U1, and the resulting error voltage is applied to a control terminal of the first power source 11 to regulate its output voltage. Similarly, the output voltage of the power source 12 is compared to a second reference voltage $V_{REF2}$ by the amplifier U2, and the resulting error voltage is applied to a control terminal of the second power source 12 to regulate its output voltage. A sense resistor R1 and its associated amplifier U3 provide a first current-sense voltage that is representative of the current supplied to the load 16 by the first power source 11, and a sense resistor R2 and its associated amplifier U4 provide a second current-sense voltage that is representative of the current supplied to the load 16 by the second power source 12. The first and second current sense voltages are compared by the amplifier U5, which provides an error voltage that is representative of the difference between the currents that are supplied to the load 16 by each of the power sources 11 and 12. The error voltage from the amplifier U5 is fed back to the feedback networks 13 and 14 to equalize the currents supplied to the load 6 by each of the power sources 11 and 12. The error voltage from the amplifier U5 is inverted by the inverter N1 prior to being fed back to the feedback network 14.

The prior art system 10 illustrated in FIGS. 1 and 2 works well to equalize the currents (and hence the power) supplied to the load 16 by each of the power sources 11 and 12. However, using the sense resistors R1 and R2 and their associated circuitry to sense the currents supplied to the load 16 is disadvantageous because it increases the parts count (i.e., the number of parts) as well as size of the system and decreases the efficiency of the system.

Figure 3:
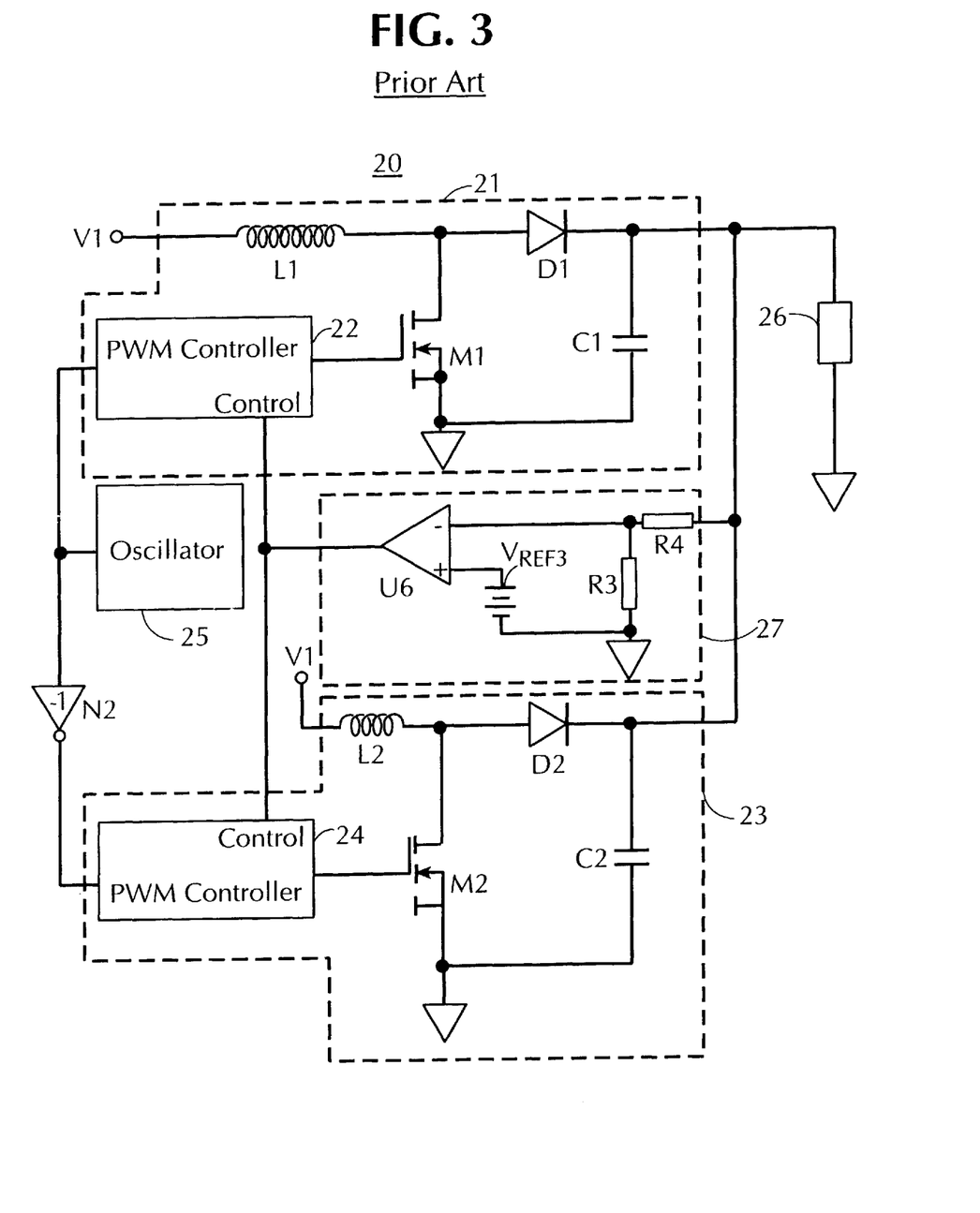
FIG. 3 is a block diagram of another prior art system for supplying power to a load.

It is known to cancel the input ripple current drawn by a system in order to power a load. It is known in the art to effect input ripple current cancellation by coupling two power sources in parallel and by providing the two power sources with switching frequencies that are 180° out of phase. The prior art system 20 illustrated in FIG. 3 provides for the cancellation of input ripple current in this manner. The system 20 includes a first boost-type power converter 21 (a first power source), which comprises a PWM controller 22, a FET power switch M1, an inductance L1, a rectifier D1, and a filter capacitor C1. The power converter 21 operates in a manner that is well-known, and will not be described further herein. The power supplied to the load 26 by the first power converter 21 is regulated by the feedback network 27 and the PWM controller 22, the output of which is coupled to the gate electrode of the FET power switch M1. A voltage divider formed by the resistors R3 and R4 of feedback network 27 divides the output voltage of the first power converter 21 and compares the divided output voltage against a reference voltage $V_{REF3}$ in the amplifier U6. The output voltage from the amplifier U6 is then coupled to the control input of the PWM controller 22 to regulate the ON time of the power switch M1.

The system 20 further includes a second boost-type power converter 23 (a second power source), which comprises a PWM controller 24, a FET power switch M2, an inductance L2, a rectifier D2, and a filter capacitor C2. The power converter 23 operates in a manner that is well-known, and will not be described further herein. The power supplied to the load 26 by the second power converter 23 is also regulated by the feedback network 27 and by the PWM controller 24, the output of which is coupled to the gate electrode of the FET power switch M2. The output voltage from the amplifier U6 is also coupled to the control input of the PWM controller 24 to regulate the ON time of the power switch M2.

As is well-known, the currents flowing through the inductors L1 and L2 in, respectively, the power converters 21 and 23 have triangular waveforms. A fixed-frequency oscillator 25 is directly coupled to the clock input of the PWM controller 22 and is coupled to the clock input of the PWM controller 24 through the inverter N2 to provide the PWM controllers 22 and 24 with clock waveforms that are 180° out of phase. As a result, the triangular current waveforms for the inductors L1 and L2 will be 180° out of phase. Therefore, the triangular component of the input current is cancelled, leaving only the DC component of the input current. The circuit of FIG. 3 does not address the problem of current or power equalization to the load 26.

U.S. Pat. No. 4,779,184 to White, issued on Oct. 18, 1988 and entitled SWITCH MODE POWER SUPPLY WITH REDUCED NOISE ("the '184 Patent") discloses a phase-locked loop for controlling the phase and duty cycle of two switch-mode power supplies that supply power to a common load to produce an output voltage which is substantially free of harmonics. The phase-locked loop maintains a desired phase shift between the drive signals of the two power supplies. A drive signal for one of the power supplies is provided by an oscillator which oscillates at a fixed frequency. The drive signal for the other power supply is provided by a voltage-controlled oscillator which oscillates at the frequency of the fixed oscillator. The power supplies disclosed in the '184 Patent are fixed frequency power supplies. The '184 Patent is not directed to substantially equalizing the load currents or power supplied by the power supplies or cancelling a ripple component of the input current drawn by the system.

U.S. Pat. No. 5,079,686 to Vinciarelli, issued on Jan. 7, 1992 and entitled ENHANCEMENT-MODE ZERO-CURRENT SWITCHING CONVERTER ("the '686 Patent"), discloses a system of enhancement-mode power converters that have their outputs coupled together to deliver power to a load. Each power converter has an associated setpoint voltage, and the power converters synchronize to the operating frequency of the power converter that has the highest setpoint voltage, and hence, the highest power output. Synchronizing information is delivered to the power converters by a synchronizing bus. The '686 Patent discloses a complex system of setpoint voltages delivered through a bus to achieve frequency synchronization and, hence, power equalization, of its power converters. There is no disclosure of phase detection. The '686 Patent does not address cancellation of an input ripple component of the input current drawn by the system. The power converters that can be used in the system disclosed in the '686 Patent are unfortunately limited to those power converters that have a linear relationship between their switching frequency and the power that they deliver to a load.

SUMMARY

The present invention relates to a system and a method with plural power sources for powering a load where the power supplied from the plural power sources is equalized. The power source may be connected in parallel, in which case the current from the power source is equalized or the power sources may be connected in series, in which case the voltages of the power sources are equalized.

The present invention may employ variable frequency power sources and may employ power sources which the relationship between the power supplied by each power source and the switching frequency of that power source is either linear or non-linear and either direct or inverse.

The present invention contemplates the use of phase detection for locking the switching frequencies of the power sources to avoid the use of bulky and inefficient components, such as sense resistors, used in current detection.

In certain applications, for example in power factor correction front-ends for switch-mode power supplies, there is a need to provide a system for supplying power to a load with the following features: variable frequency operation of the power sources, good current sharing over the entire range of the input voltage waveform, and good input current ripple cancellation.

It is desirable to have a system for supplying power to the load that utilizes variable-frequency power sources that provide power over a range of switching frequencies. In order to provide such a system with minimum complexity and minimum cost, it is desirable that such a system use phase detection to lock together the switching frequencies of the variable-frequency power sources in order to automatically and substantially equalize the currents (and hence power) supplied by the power sources to the load, and to cancel the ripple component of the input current drawn by the system.

The present invention is directed to a system and a method that use variable-frequency power sources for supplying power to a load. The system and method use phase detection in order to automatically and substantially equalize the currents supplied to a load by each of the variable-frequency power sources, and to cancel a ripple component of the input current drawn by the system.

According to a feature of the present invention, a system for supplying power to a load comprises first and second power sources for supplying power to the load. The power sources have a similar relationship between their respective variable switching frequencies and the power that they supply to the load. A phase detection means locks the first and second switching frequencies of, respectively, the first and second power sources to one another to substantially equalize the power supplied to the load by each power source.

According to another feature of the present invention, a system for providing power factor correction to a power supply comprises first and second power sources for supplying input power to the power supply. Each of the power sources has a relationship between the power it supplies and its switching frequency. That relationship can be either linear or non-linear and either direct or inverse, and the first and second power sources have a similar such relationship. A phase detection means locks the first and second switching frequencies of, respectively, the first and second power sources to one another to substantially equalize the input power supplied to the power supply by each of the power sources.

According to yet another feature of the present invention, power is supplied to a load by selecting first and second power sources that have a similar relationship between their respective variable switching frequencies and the power that they supply to the load. The first and second switching frequencies of, respectively, the first and second power sources are varied. The switching frequencies are locked to one another using phase detection to substantially equalize the power supplied to the load by each of the power sources.

According to a further feature of the present invention, power factor correction is provided to a power supply by selecting first and second power sources to have a similar relationship between their respective variable switching frequencies and the input power that they supply to the power supply. One of the first or second switching frequencies of, respectively, the first or second power sources is set. The switching frequency of each of the power sources has a relationship to the power supplied by that power source that can be either linear or non-linear and either direct or inverse. The switching frequencies are locked to one another using phase detection to substantially equalize the input power supplied to the power supply by each of the power sources.

The above, and other features, aspects, and advantages of the present invention will become apparent from the following description read in conjunction with the accompanying drawings, in which like reference numerals designate the same elements.

DETAILED DESCRIPTION OF THE PREFERRED EMBODIMENTS

Figure 4:
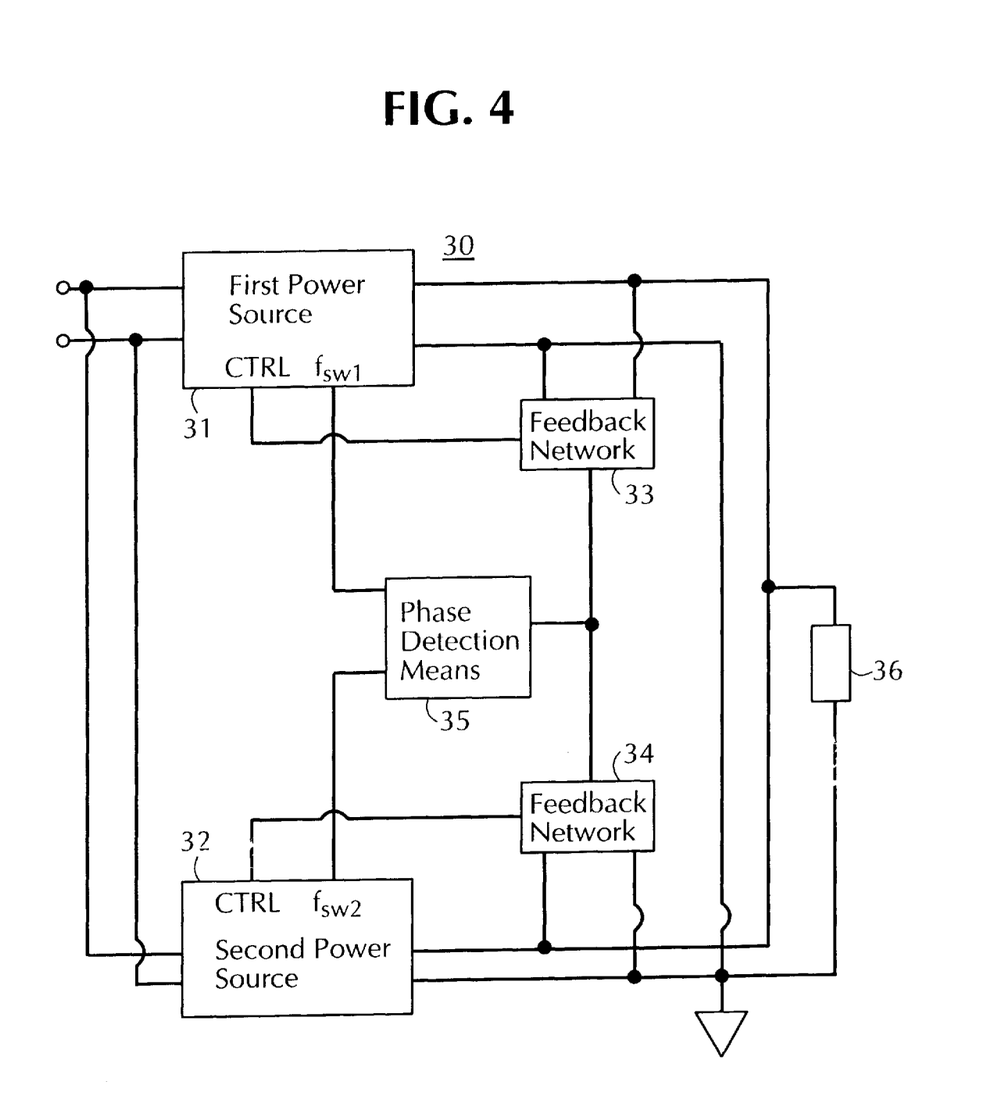
FIGS. 4 and 5 are block diagrams that illustrate a system for supplying power to a load according to a feature of the present invention.
Figure 5:
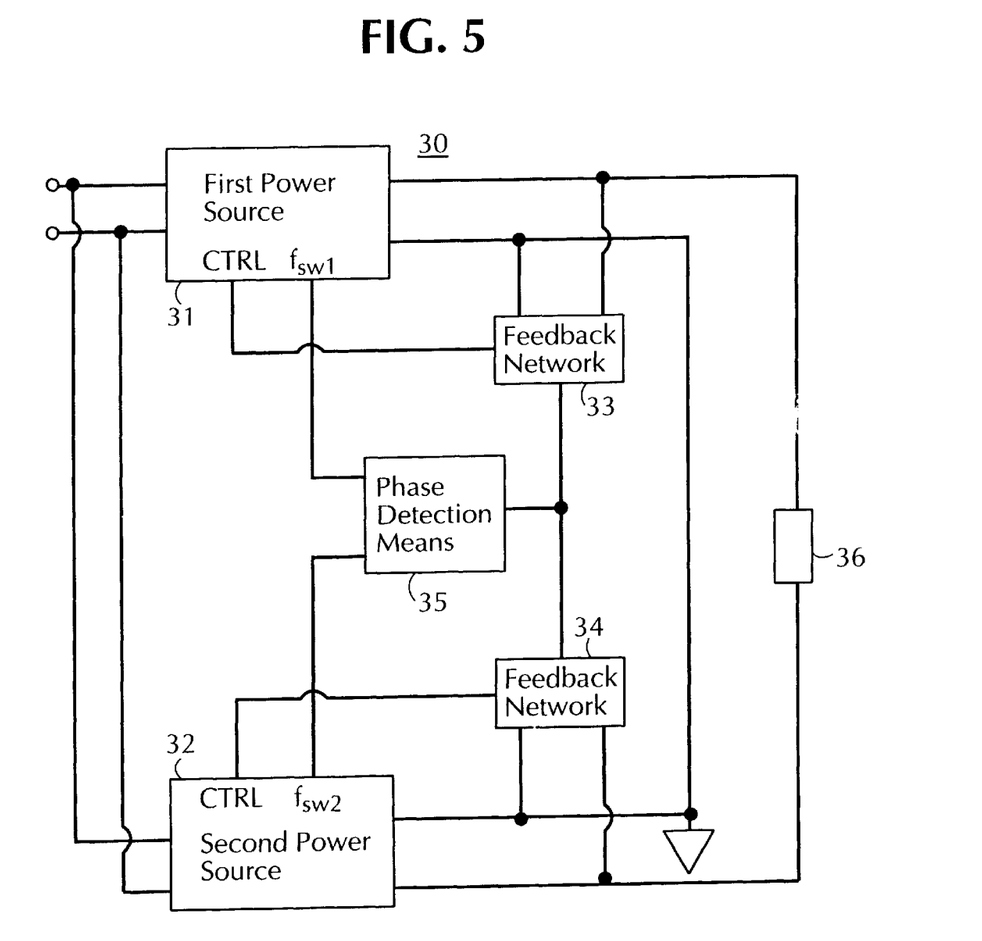

FIG. 4 shows a block diagram that illustrates a system 30 for supplying power to the load 6 according to the present invention. The system 30 includes first and second power sources 31 and 32 which are coupled together at their input terminals and supply power to the same load 36. Each of the power sources 31 and 32 is a variable-frequency power source that has a relationship between its switching frequency and the power that it supplies to a load. For example, each power source 31 and 32 can have a relationship between its switching frequency and the power that it supplies to a load that is either linear or non-linear. At the same time, each power supply can also have a relationship between its switching frequency and the power that it supplies to the load that is direct, so that power and switching frequency increase or decrease in the same direction, or inverse, so that power and switching frequency change in opposite directions. The power sources 31 and 32 of the system 30 have similar relationships between their switching frequencies and the power that they supply to the load 36. The first and second power sources 31 and 32 can be coupled to one another in parallel, as shown in FIG. 4, or in series, as shown in FIG. 5. For the sake of simplicity, the description of the present invention will be made primarily with reference to the parallel embodiment shown in FIG. 4.

Referring to FIG. 4, the system further includes feedback networks 33 and 34 associated with, respectively, the first and second power sources 31 and 32. The first feedback network 33 couples a portion of the output voltage of the first power source 31 to a control terminal CTRL of the first power source 31 to vary the first switching frequency $f_{sw1}$ of the first power source 31, thereby regulating the power supplied by the first power source 31 to the load 36. Similarly, the second feedback network 34 couples a portion of the output voltage of the second power source 32 to a control terminal CTRL of the second power source 32 to vary the second switching frequency $f_{sw2}$ of the second power source 32, thereby regulating the power supplied by the second power source 32 to the load 36.

According to a feature of the present invention, a phase detection means 35, which may be any conventional phase detector, provides an error signal that is representative of the difference between the first switching frequency $f_{sw1}$ of the first power source 31 and the second switching frequency $f_{sw2}$ of the second power source 32. The first switching frequency $f_{sw1}$ is coupled from a terminal of the first power source 31 and is applied to an input terminal of the phase detection means 35. Similarly, the second switching frequency $f_{sw2}$ is coupled from a terminal of the second power source 32 and is applied to the other input terminal of the phase detection means 35. The error signal provided by the phase detection means 35 is coupled to the feedback networks 33 and 34. The result is that the first and second switching frequencies $f_{sw1}$ and $f_{sw2}$ are locked to one another.

Furthermore, because the first and second power sources 31 and 32 have similar relationships between their switching frequencies and the power that they supply to a load, the power supplied to the load 36 by the first power source 31 is substantially equal to the power supplied to the load 36 by the second power source 32. In the embodiment of the present invention illustrated in FIG. 4, the substantial equalization of the power supplied to the load 36 by the first and second power sources 31 and 32 means that the currents supplied to the load 36 by each of the power sources 31 and 32 are substantially equalized, because the power sources 31 and 32 are coupled to one another in parallel and, thus, apply the same voltage to the load 36. In the embodiment of the present invention illustrated in FIG. 5, the substantial equalization of the power supplied to the load 36 by the first and second power sources 31 and 32 means that the voltages supplied to the load 36 by each of the power sources 31 and 32 are substantially equalized, because the power sources 31 and 32 are coupled to one another in series and thus provide the same current to the load 36.

Figure 6:
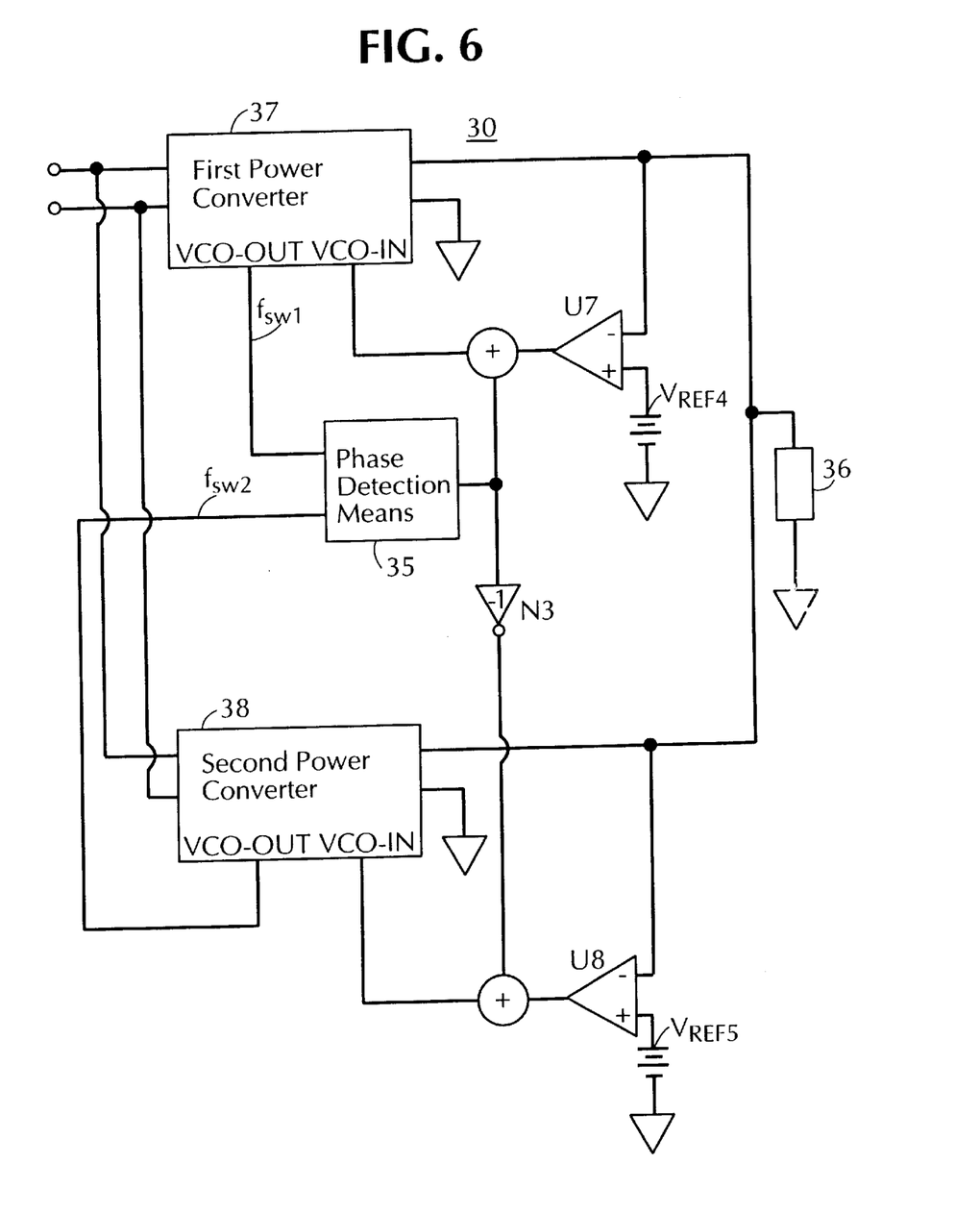
FIGS. 6 and 7 are schematic diagrams illustrating the inventive system shown in FIG. 4.

A schematic illustration of the inventive system 30 of FIG. 4 is shown in FIG. 6, where the power sources are power converters. The system 30 includes first and second variable-frequency power converters 37 and 38, the amplifiers U7 and U8, the phase detector 35, and the inverter N3. The power converters 37 and 38 are coupled to one another in parallel to provide DC power to the load 36. The amplifier U7 provides a feedback voltage that is representative of the difference between the output voltage provided by the first power converter 37 and a reference voltage $V_{REF4}$ to regulate the voltage applied to the load by the first power converter 37. The feedback voltage provided by the amplifier U7 is applied to a voltage-controlled oscillator at the VCO-IN terminal of the first power converter 37 to control the switching frequency of, and hence the power supplied by, the first power converter 37. The phase detection means 35 and the voltage-controlled oscillator of the first power converter 37 together comprise a phase-locked loop. The bandwidth of this phase-locked loop is greater than or equal to the bandwidth of the feedback loop provided from the output of the first power converter 37 to its VCO-IN terminal by the amplifier U7.

Similarly, the amplifier U8 provides a feedback voltage that is representative of the difference between the output voltage provided by the second power converter 38 and a reference voltage $V_{REF5}$ to regulate the voltage applied to the load by the second power converter 38. The feedback voltage provided by the amplifier U8 is applied to a voltage-controlled oscillator at the VCO-IN terminal of the second power converter 38 to control the switching frequency of, and hence the power supplied by, the second power converter 38. The phase detection means 35 and the voltage-controlled oscillator of the second power converter 38 together comprise a phase-locked loop. The bandwidth of this phase-locked loop is greater than or equal to the bandwidth of the feedback loop provided from the output of the second power converter 38 to its VCO-IN terminal by the amplifier U8.

The first and second switching frequencies $f_{sw1}$ and $f_{sw2}$ of, respectively, the first and second power converters 37 and 38 are made available at a terminal VCO-OUT of the respective power converters 37 and 38, and are coupled as inputs to the phase detection means 35. Any difference in the output power supplied to the load 6 by the power converters 36 and 37 will result in a difference in the first and second switching frequencies $f_{sw1}$ and $f_{sw2}$, which will cause a continuously changing phase shift between the first and second switching frequencies $f_{sw1}$ and $f_{sw2}$ at the inputs to the phase detection means 35. The phase detection means 35 provides an error voltage that is a function of the phase difference of the signals at its inputs. Thus, the phase detection means 35 detects the difference between the first and second switching frequencies $f_{sw1}$ and $f_{sw2}$ at its input terminals, and provides an error voltage that is summed with the voltages provided by the amplifiers U7 and U8 to lock together the first and second switching frequencies $f_{sw1}$ and $f_{sw2}$ of the first and second power converters 37 and 38, thereby substantially equalizing the power supplied to the load 6 by each of the power converters 37 and 38. The error voltage from the phase detection means 35 is inverted by the inverter N3 before being summed with the output voltage of the amplifier U8. Again, because the power converters 37 and 38 are coupled together in parallel and have a similar relationship between their respective switching frequencies and the power that they supply to the load 36, the currents provided to the load 36 by each of the power converters 37 and 38 are substantially equalized by the operation of the phase detection means 35.

Figure 7:
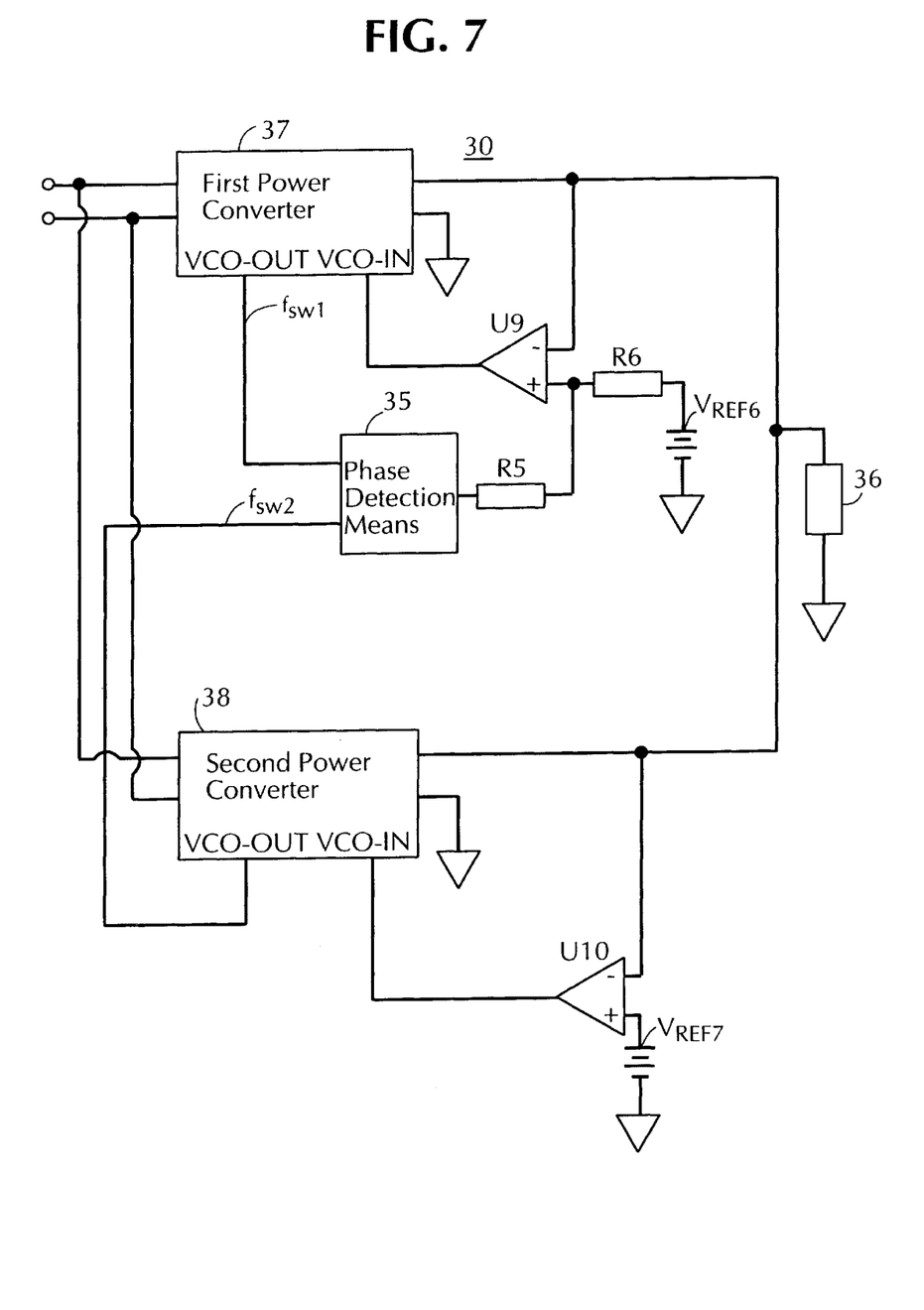

In an alternative embodiment of the inventive system 30 described herein, and shown in FIG. 7, the error signal generated by the phase detection means 35 is applied to only the first power converter 37. The error voltage from the phase detection means 35 is coupled to the non-inverting input of the amplifier U9 through a resistor R5. As a result, the first switching frequency $f_{sw1}$ of the first power converter 37 is locked to the second switching frequency $f_{sw2}$ of the second power converter 38. The first power converter 37 thus has a "slave" relationship with respect to the "master" second power converter 38. It will be apparent to those having ordinary skill in the art that the second switching frequency $f_{sw2}$ of the second power converter 38 can, alternatively, be locked to the first switching frequency $f_{sw1}$ of the first power converter 37 so that the second power converter 38 has a "slave" relationship with respect to the "master" first power converter 37.

Figure 8:
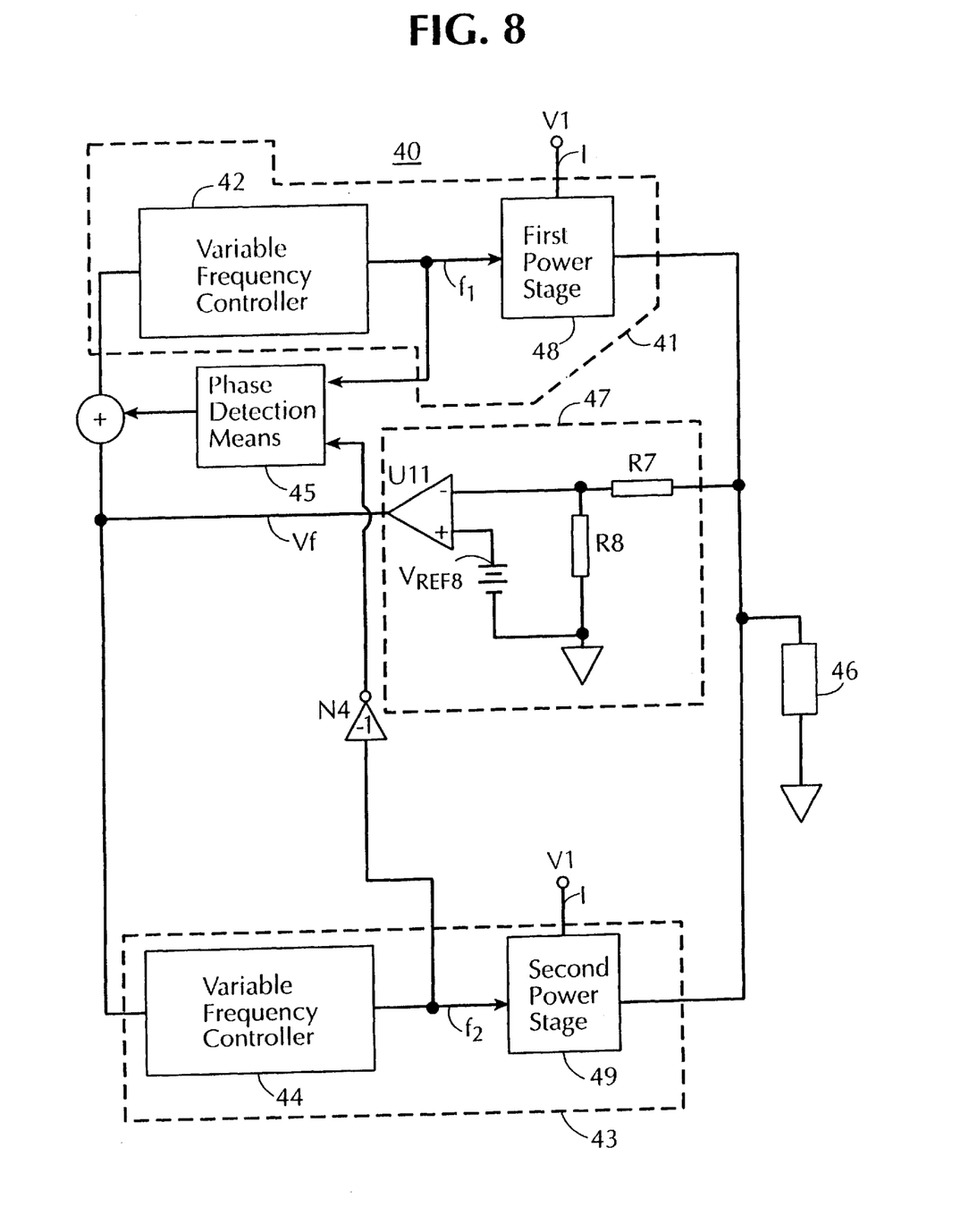
FIG. 8 is a diagram, in block and schematic form, that illustrates a feature of the inventive system described herein.

FIG. 8 illustrates, in block and schematic form, a further feature of the inventive system described herein. A system 40 for delivering power to the load 46 includes a first power source 41, which includes a variable-frequency controller 42 and its associated first power stage 48. The power supplied to the load 46 by the first power source 41 is regulated by the feedback network 47 and the first variable-frequency controller 42. The system 40 further includes a second power source 43, which includes a variable-frequency controller 44 and its associated second power stage 49. The second power source 43 is coupled in parallel to the first power source 41. The power supplied to the load 46 by the second power source 43 is also regulated by the feedback network 47 and a second variable-frequency controller 44.

Each of the power sources 41 and 43 is a variable-frequency power source that has a relationship between its switching frequency and the power that it supplies to a load. For example, each power source 41 and 43 can have a relationship between its switching frequency and the power that it supplies to a load that is either linear or non-linear. At the same time, each power source can also have a relationship between its switching frequency and the power that it supplies to the load that is direct, so that power and switching frequency increase or decrease in the same direction, or inverse, so that power and switching frequency change in opposite directions. The power sources 41 and 43 of the system 40 have similar relationships between their respective switching frequencies and the power that they supply to the load 46.

According to a feature of the present invention, the drive waveform provided by the first variable frequency controller 42 in the first power source 41 is also provided to an input terminal of the phase detection means 45. The drive waveform provided by the second variable frequency controller 44 in the second power source 43 is inverted by the inverter N4 before being provided to another input terminal of the phase detection means 45. The error signal provided by the phase detection means 45, which represents the phase difference between the drive waveform of the first variable-frequency controller 42 and the inverted drive waveform of the second variable-frequency controller 44, is summed with the feedback voltage $V_f$ provided by the feedback network 47 to lock together the frequencies $f_1$ and $f_2$ of the drive waveforms provided by the variable frequency controllers 42 and 44, while maintaining the two drive waveforms substantially 180° out of phase with respect to one another.

Once the frequencies $f_1$ and $f_2$ of the two drive waveforms are locked together, the power supplied to the load 46 by each of the power sources 41 and 43 will be substantially equal because the power sources 41 and 43 have similar relationships between their respective switching frequencies and the power that they supply to the load 46. The currents supplied to the load 46 by the power sources 41 and 43 will be substantially equal because the power sources 41 and 43 are coupled together in parallel. As a result of the phase difference between the two drive waveforms, the triangular component of the input current I drawn by the system will be cancelled, leaving only the DC component of the input current.

Figure 9:
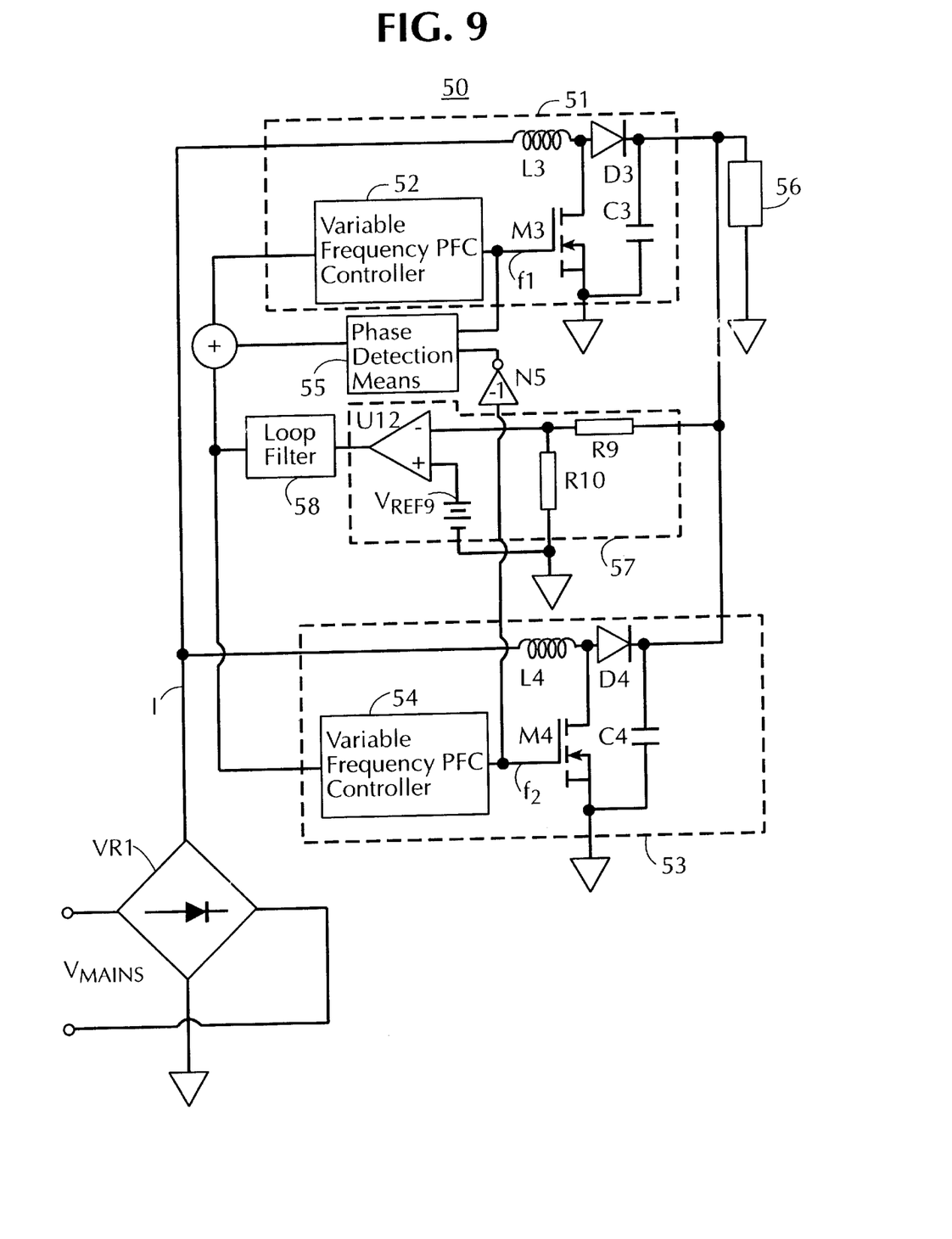
FIG. 9 is a diagram, in block and schematic form, of a preferred embodiment of the inventive system described herein.

In a presently preferred embodiment, the system 40 of FIG. 8 is advantageously utilized to provide a power factor correction (PFC) front-end for a switch-mode power supply. FIG. 9 shows an embodiment of the system of FIG. 8 used for power factor correction. The purpose of a power factor correction front-end is to achieve an input current for a switch-mode power supply that is proportional to the AC input voltage $V_{MAINS}$. For example, if the AC input voltage $V_{MAINS}$ has the waveform of a sine wave, then the power factor correction front-end draws an input current that also has the waveform of a sine wave.

In the presently preferred embodiment shown in FIG. 9, the load 56 represents a switch-mode power supply. An AC input voltage $V_{MAINS}$ is rectified by the bridge rectifier VR1 to provide a DC input voltage to the first and second power converters 51 and 53. In the system 50, as in all power factor correction front-ends, the frequency of the AC input voltage $V_{MAINS}$ is lower than the switching frequencies of the first and second power converters 51 and 53. The first and second power converters 51 and 53 each utilize a boost-type DC—DC power converter, which has a relationship between its switching frequency and the power it supplies to a load that is both non-linear and inverse. The first power converter 51 includes a variable-frequency PFC controller 52, the inductor L3, the FET power switch M3, the rectifier D3, and the filter capacitor C3. The second power converter 53 includes a variable-frequency PFC controller 54, the inductor L4, the FET power switch M4, the rectifier D4, and the filter capacitor C4. In the presently preferred embodiment, the boost-type power converters 51 and 53 operate at the edge of the continuous and discontinuous modes of conduction, which necessitates that the power converters 51 and 53 be of the variable-frequency type. The operation of the boost-type power converters 51 and 53 is well-known to those having ordinary skill in the art, and will not be described further herein.

The variable frequency PFC controllers 52 and 54, which provide the drive waveforms with frequencies $f_1$ and $f_2$ to, respectively, the first and second power converters 51 and 53, will change the frequencies $f_1$ and $f_2$ of their respective drive waveforms as a function of the momentary input voltage $V_{MAINS}$ to maintain the input current to the switch-mode power supply proportional to the AC input voltage $V_{MAINS}$, which is coupled to the load 56 by the first and second power converters 51 and 53. The DC output voltage of the power converters 51 and 53 is divided by the voltage divider formed by the resistors R9 and R10, and the divided voltage is compared by the amplifier U12 against a reference voltage $V_{REF9}$ to provide a feedback voltage that is coupled to the first and second variable-frequency PFC controllers 52 and 54.

The drive waveforms with frequencies $f_1$ and $f_2$ of the variable frequency PFC controllers 52 and 54 are also applied to the input terminals of the phase detection means 55. The phase detection means 55 provides an error signal that is representative of the frequency and phase difference between the drive waveforms with frequencies $f_1$ and $f_2$. The loop filter 58 shapes the frequency response of the feedback network 58 to provide a desired frequency response for the feedback network 58. The error signal is summed with the feedback voltage provided by the feedback network 57 and coupled to the first and second variable frequency PFC controllers 52 and 54. The phase detector 55 thus forms a separate phase-locked loop with each of the variable frequency PFC controllers 52 and 54. The bandwidths of these phase-locked loops are significantly greater than the frequency of the AC input voltage $V_{MAINS}$.

The drive waveforms of the variable frequency PFC controllers 52 and 54 are locked to the same frequency by the operation of the phase detection means 55. As a result, the power supplied to the switch-mode power supply by each of the boost-type power converters 51 and 53 is substantially equalized because both power converters 51 and 53 have a similar relationship between their respective switching frequencies and the power that they deliver to the load 56. The currents supplied by the power converters 51 and 52 are substantially equalized because the power converters are coupled together in parallel. The ripple component of the input current I drawn by the system is then substantially cancelled because the phase detection means 55 regulates the drive waveforms provided by the variable frequency controllers 52 and 54 to be substantially 180° out of phase.

Having described preferred embodiments of the invention with reference to the accompanying drawings, it is to be understood that the invention is not limited to those precise embodiments, and that various changes and modifications may be effected therein by one having ordinary skill in the art without departing from the scope or spirit of the invention as defined in the appended claims.

What is claimed is:

1. A system for supplying power to a load, said system comprising:
    first and second power sources for supplying power to said load, said power sources having a similar relationship between a variable switching frequency of said power source and the power supplied by said power source to said load; and,
    phase detection means coupled to at least one of said first and second power sources for locking first and second switching frequencies of, respectively, said first and second power sources to one another to substantially equalize the power supplied to said load by each power source.

2. The system of claim 1, wherein the phase detection means locks the switching frequency of said one of said first and second power sources to the switching frequency of the other one of said first and second power sources.

3. The system of claim 1, wherein said error signal is also inverted and coupled to the other one of said first and second power sources.

4. The system of claim 1, wherein said first and second power sources are coupled to one another in parallel.

5. The system of claim 4, wherein said phase detection means locks said first and second frequencies to one another to substantially equalize the currents supplied by each of said first and second power sources to said load.

6. The system of claim 5, wherein said first and second switching frequencies are substantially 180° out of phase.

7. The system of claim 6, wherein a ripple current component of an input current supplied to said first and second power sources is substantially cancelled.

8. The system of claim 1, wherein said first and second power sources are coupled to one another in series.

9. The system of claim 8, wherein said phase detection means locks said first and second frequencies to one another to substantially equalize the voltages supplied by each of said first and second power sources to said load.

10. The system of claim 1, further comprising:
    a feedback loop for each of said first and second power sources for regulating an output voltage supplied by said power sources; and,
    a voltage-controlled oscillator coupled to said phase detection means to provide a phase-locked loop, the bandwidth of said phase-locked loop being greater than or equal to the bandwidth of said feedback loop.

11. A system for providing power factor correction to a power supply, said system comprising:
    first and second power sources for supplying input power to said power supply, where each of said power sources has a relationship between the power supplied by said power source and a switching frequency of said power source that can be either linear or non-linear and either direct or inverse, said first and second power sources having a similar such relationship; and,
    phase detection means for locking first and second switching frequencies of, respectively, said first and second power sources to one another to substantially equalize the input power supplied to said power supply by each of said power sources.

12. The system of claim 11, further comprising a voltage-controlled oscillator coupled to said phase detection means for providing a phase-locked loop, wherein the bandwidth of said phase-locked loop is significantly greater than the frequency of an input signal to said first and second power sources.

13. The system according to claim 12, wherein each of said power sources has a relationship between the power supplied by said power source and a switching frequency of said power source that is non-linear.

14. The system according to claim 13, wherein each of said power sources has a relationship between the power supplied by said power source and a switching frequency of said power source that is inverse.

15. The system according to claim 14, wherein each of said power sources comprises a boost converter.

16. A method for supplying power to a load, said method comprising the steps of:
    selecting first and second power sources having a similar relationship between a variable switching frequency of said power source and the power supplied by said power source to said load;
    varying at least one of first and second switching frequencies of, respectively, said first and second power sources;
    generating an error signal; and,
    coupling said error signal to at least one of said first and second power sources to lock said switching frequencies to one another to substantially equalize the power supplied to said load by each of said power sources.

17. The method of claim 16, further comprising the step of locking the switching frequency of said one of said first and second power sources to the switching frequency of the other one of the first and second power sources.

18. The method of claim 16, further comprising the step of inverting and coupling said error signal to the other one of said first and second power sources.

19. The method of claim 16, further comprising the step of coupling said first and second power sources in parallel.

20. The method of claim 19, wherein said locking step comprises locking said first and second frequencies to one another to substantially equalize the currents supplied by said first and second power sources to said load.

21. The method of claim 20, further comprising the step of setting said first and second switching frequencies to be substantially 180° out of phase with one another.

22. The method of claim 21, further comprising the step of substantially cancelling a ripple current component of an input current supplied to said first and second power sources.

23. The method of claim 16, further comprising the step of coupling said first and second power sources in series.

24. The method of claim 23, wherein said locking step comprises locking said first and second frequencies to one another to substantially equalize the voltages supplied by said first and second power sources to said load.

25. The method of claim 16, further comprising the steps of:

generating an error signal;

coupling said error signal to a variable-frequency controller of at least one of said first and second power sources to provide a phase-locked loop; and, regulating the output voltages supplied by said power sources using a feedback loop which has a bandwidth which is less than or equal to the bandwidth of said phase-locked loop.

26. A method for providing power factor correction to a power supply, said method comprising the steps of:

selecting first and second power sources to have a similar relationship between a switching frequency of said power source and the input power supplied by said power source to said power supply;

setting at least one of a first and second switching frequencies of, respectively, said first and second power sources, where said switching frequencies have a relationship to the power supplied by their respective power source that can be either linear or non-linear and either direct or inverse; and, locking said switching frequencies to one another using phase detection to substantially equalize the input power supplied to said power supply by each of said power sources.

27. The method of claim 26, wherein said locking step comprises the steps of:

generating an error signal;

coupling said error signal to a variable-frequency controller to provide a phase-locked loop; and setting the bandwidth of said phase-locked loop to be significantly greater than the frequency of an input signal to said first and second power sources.

28. The method of claim 27, wherein said setting step is performed according to said relationship being non-linear.

29. The method of claim 28, wherein said setting step is performed according to said relationship being inverse.

30. The method of claim 29, wherein said selecting step comprises selecting first and second boost converters.

* * * * *